US012498220B2

United States Patent
Zhang et al.

(10) Patent No.: US 12,498,220 B2
(45) Date of Patent: Dec. 16, 2025

(54) MULTI-FIELD INTEGRATED MONITORING SYSTEM AND METHOD FOR RESERVOIR LANDSLIDE WATER-LEVEL-FLUCTUATION ZONE

(71) Applicant: CHINA UNIVERSITY OF GEOSCIENCES (WUHAN), Wuhan (CN)

(72) Inventors: Xinping Zhang, Wuhan (CN); Junrong Zhang, Wuhan (CN); Huiming Tang, Wuhan (CN); Changdong Li, Wuhan (CN); Xinli Hu, Wuhan (CN); Yongquan Zhang, Wuhan (CN)

(73) Assignee: CHINA UNIVERSITY OF GEOSCIENCES (WUHAN), Wuhan (CN)

( * ) Notice: Subject to any disclaimer, the term of this patent is extended or adjusted under 35 U.S.C. 154(b) by 343 days.

(21) Appl. No.: 18/471,328

(22) Filed: Sep. 21, 2023

(65) Prior Publication Data
US 2024/0068809 A1 Feb. 29, 2024

(51) Int. Cl.
*G01C 13/00* (2006.01)
*G01M 3/00* (2006.01)
*G08C 17/02* (2006.01)

(52) U.S. Cl.
CPC ........... *G01C 13/008* (2013.01); *G01M 3/002* (2013.01); *G08C 17/02* (2013.01)

(58) Field of Classification Search
CPC ........... G01M 3/26; G01M 3/04; G01M 3/02; G01M 3/3263; G01M 3/3236; G01M 3/16;
(Continued)

(56) References Cited

U.S. PATENT DOCUMENTS

| 8,692,668 B2 * | 4/2014 | Ramesh | G08B 21/10 340/539.22 |
| 11,719,838 B2 * | 8/2023 | Zhang | G01C 13/004 73/322.5 |

(Continued)

FOREIGN PATENT DOCUMENTS

| CN | 108871428 A | * 11/2018 | ............. G01D 21/02 |
| EP | 3974774 A1 | * 3/2020 | ............. G01C 13/00 |

(Continued)

Primary Examiner — Andre J Allen
(74) Attorney, Agent, or Firm — True Shepherd LLC; Andrew C. Cheng (57) ABSTRACT

A monitoring system includes a reference station, a mobile station, a plurality of integrated sensing units, and a server. The reference station is configured to provide fixed reference coordinates to the server. The mobile station transmits multi-frequency electromagnetic wave signals to the integrated sensing units. Based on water depth and position information detected by sensors of the integrated sensing units in combination with information of electromagnetic wave signals as well as a propagation distance and time, displacement information of the integrated sensing units can be obtained. The data is transmitted to the mobile station, which further transmits the data to the server, to accomplish monitoring for the reservoir landslide water-level-fluctuation zone. Automated monitoring is achieved and the monitoring cycle covers the entire deformation and evolution phases of landslides.

8 Claims, 7 Drawing Sheets

(58) Field of Classification Search
CPC .... G01M 3/20; G01M 3/2876; G01M 3/3227; G01M 3/002; G01M 3/2815; G01M 3/38; G01M 3/226; G01M 3/2807; G01M 3/3218; G01M 3/025; G01M 3/24; G01M 3/202; G01M 3/045; G01M 3/2846; G01M 3/165; G01M 3/3281; G01M 3/3254; G01M 3/228; G01M 3/32; G01M 3/40; G01M 3/00; G01M 3/18; G01M 3/205; G01M 3/2892; G01M 3/329; G01M 3/042; G01M 3/047; G01M 3/22; G01M 3/243; G01M 3/186; G01M 3/3245; G01M 3/3272; G01M 3/2869; G01M 3/227; G01M 3/229; G01M 3/2853; G01M 3/34; G01M 3/027; G01M 3/28; G01M 3/022; G01M 3/12; G01M 3/2884; G01M 3/007; G01M 3/10; G01M 3/3209; G01M 3/283; G01M 3/146; G01M 3/184; G01M 3/207; G01M 3/36; G01M 3/183; G01M 3/363; G01M 13/005; G01M 3/06; G01M 3/005; G01M 13/00; G01M 3/145; G01M 3/188; G01M 3/224; G01M 3/08; G01M 3/185; G01M 3/187; G01M 3/222; G01M 3/223; G01M 3/2838; G01M 3/366; G01M 17/007; G01M 3/2861; G01M 15/09; G01M 3/088; G01M 3/148; G01M 3/2823; G01M 99/00; G01M 15/04; G01M 15/14; G01M 3/14; G01M 3/225; G01M 3/106; G01M 15/042; G01M 15/102; G01M 17/00; G01M 3/081; G01M 3/083; G01M 3/103; G01M 3/143; G01M 3/147; G01M 3/246; G01M 5/0033; G01M 5/005; G01M 5/0058; G01M 9/06; G01M 9/065; G01M 99/007; G01M 11/085; G01M 13/045; G01M 15/12; G01M 17/02; G01M 3/085; G01M 3/086; G01M 3/181; G01M 3/182; G01M 3/30; G01M 5/0025; G01M 99/005; G01C 13/004; G01C 13/006; G01C 13/002; G01C 13/00; G01C 13/008; G01C 5/06; G01C 15/00; G01C 9/14; G01C 23/00; G01C 17/00; G01C 17/34; G01C 21/28; G01C 5/04; G01C 9/00; G01C 9/06; G01C 9/18; G01C 15/002; G01C 21/16; G01C 21/185; G01C 21/203; G01C 21/3691; G01C 5/005; G01C 9/12

USPC .......................................... 73/170.16–170.31

See application file for complete search history.

(56) References Cited

U.S. PATENT DOCUMENTS

| | | | |
|---|---|---|---|
| 11,859,974 B2 * | 1/2024 | Zhang | ................ G01M 5/0025 |
| 2001/0047227 A1 | 11/2001 | Baraty | |
| 2018/0204440 A1 | 7/2018 | Mutzig | |
| 2019/0257979 A1 | 8/2019 | Hyland | |

FOREIGN PATENT DOCUMENTS

| | | | | |
|---|---|---|---|---|
| GB | 2509256 B | * | 8/2014 | ............. B63B 22/04 |
| KR | 100380861 B1 | * | 4/2003 | ............. G08B 21/10 |
| KR | 100648462 B1 | * | 11/2006 | ............... G01C 5/00 |
| KR | 102587369 B1 | * | 10/2023 | ............. G08B 21/10 |

\* cited by examiner

MULTI-FIELD INTEGRATED MONITORING SYSTEM AND METHOD FOR RESERVOIR LANDSLIDE WATER-LEVEL-FLUCTUATION ZONE

CROSS-REFERENCE TO RELATED APPLICATIONS

This application claims priority to Chinese Patent Application No. 202311092070.X with a filing date of Aug. 25, 2023. The content of the aforementioned application, including any intervening amendments thereto, is incorporated herein by reference.

TECHNICAL FIELD

The present disclosure relates to the technical field of landslide geological disaster monitoring, and in particular to a monitoring system and method for a reservoir landslide water-level-fluctuation zone.

BACKGROUND

China has many mountainous areas where a large number of reservoir dams have been constructed. Due to geological conditions and reservoir scheduling, reservoir areas are prone to geological hazards. Landslides are the most common geological hazards, which are widely distributed, numerous in quantity, and serious in harm. The water-level-fluctuation zone is a key location in the evolution of reservoir landslides. Due to the perennial fluctuation of the reservoir water level, the water-level-fluctuation zone undergoes strong water action, which causes significant evolution characteristics accompanied with local collapses. It is a prerequisite and technological basis to developing a continuous, accurate, and effective method for monitoring characteristic information of a reservoir landslide water-level-fluctuation zone for effective prevention and control of reservoir landslides.

Due to the unique monitoring environment of the water-level-fluctuation zone, there are many challenges in aspects of reliability, accuracy, and power supply during the implement monitoring devices in the reservoir landslide water-level-fluctuation zone. On one hand, it requires monitoring devices in water-level-fluctuation zones to adapt to both air and deep water conditions (up to 30 meters deep) due to reservoir regulation. Due to the fluctuation of the water level and factors such as corrosion and water wave impact, it is difficult for many monitoring means to function effectively, such as traditional cable displacement sensors and distributed optical fiber as well as recently developed unmanned aerial vehicle (UAV) close-range photogrammetry. On the other hand, non-contact monitoring methods such as sonar and laser ranging are limited in accuracy due to inter-medium reflection and intra-medium scattering.

Therefore, it is important to develop a monitoring system that can adapt to large deformations in the underwater monitoring environment, have long endurance, and provide high accuracy and reliability to meet the current need of information monitoring for reservoir landslide water-level-fluctuation zones. This system can offer a new monitoring method and prediction method for reservoir landslide prevention and control, which has a significant engineering application value and scientific theoretical significance.

SUMMARY

An objective of the present disclosure is to provide a monitoring system and method for a reservoir landslide water-level-fluctuation zone. The system includes: two onshore monitoring stations, a plurality of integrated sensing units, and a server.

The integrated sensing unit includes: a housing assembly, a control board, a water pressure and water temperature sensor, a cable sealing and clamping device, a signal receiving device, a three-axis acceleration sensor, a temperature and humidity sensor, and a related circuit.

The signal receiving device includes a signal receiving antenna and a signal processing module.

The two onshore monitoring stations include a reference station and a mobile station.

The reference station is equipped with a Global Navigation Satellite System (GNSS), a solar power supply device, and a 5G module, and is fixed outside a landslide boundary to obtain a reference position for landslide deformation monitoring data.

The mobile station is equipped with the GNSS, an electromagnetic wave transmitting device, the solar power supply device, a 5G module, and a Controller Area Network (CAN) receiving module, and is arranged on a slope surface near the water and above a highest reservoir water level, to obtain position information of the integrated sensing units.

The GNSS of the reference station is configured to obtain geographical coordinate information of the reference station as fixed reference coordinates and establish a relative coordinate system.

The GNSS of the mobile station is configured to obtain geographical coordinate information of the mobile station, and establish a relative position within the coordinate system established based on the reference station.

The solar power supply device of the reference station is configured to power the reference station and the solar power supply device of the mobile station is configured to power the mobile station and the monitoring system.

The 5G module of the reference station is configured to transmit the position information of the reference station to the server and the mobile station.

The 5G module of the mobile station is configured to receive the position information of the reference station, and transmit all sensor data and position data to the server for processing.

The control board, the temperature and humidity sensor, the three-axis acceleration sensor, and the signal processing module of the signal receiving device are sealed inside the housing assembly; the water pressure and water temperature sensor is configured to measure a water depth, a water temperature, and a surge impact pressure.

The cable sealing and clamping device is configured to prevent water or soil from entering the housing assembly, and prevent waterproofness of the housing assembly from being destroyed when a cable is dragged.

The signal receiving antenna is arranged in the signal receiving device to receive electromagnetic wave signals transmitted by the mobile station.

The control board is configured to process signals detected by the integrated sensing units and the received electromagnetic wave signals.

The three-axis acceleration sensor is configured to measure position changes of the integrated sensing units.

The temperature and humidity sensor is configured to monitor temperature and humidity changes within the housing assembly to help determine whether water has entered the housing assembly, and send alert information and immediately cut off power within the housing assembly to protect circuits when humidity exceeds a certain value.

The related circuit provides a standard power to the sensors and the circuits, and isolates an input power and an output power from each other to reduce measurement errors caused by power fluctuations. The related circuit is connected to the three-axis acceleration sensor, the temperature and humidity sensor, the water pressure and water temperature sensor, and the signal receiving device to obtain monitoring data and transmits the monitoring data to the mobile station via a CAN bus.

In one embodiment, the electromagnetic wave transmitting device includes a radio frequency (RF) signal generator, an RF amplification module, and an antenna. The RF signal generator is configured to generate an electromagnetic wave signal with a continuously adjustable frequency. The RF amplification module performs power amplification on the electromagnetic wave signal generated by the RF signal generator, and the amplified electromagnetic wave signal is transmitted through the antenna.

In one embodiment, the signal processing module includes: a quadrature demodulation unit, an RF amplification unit, a high-pass filter, and a receiving antenna Sub-Miniature version A (SMA) interface.

In one embodiment, a propagation time of the electromagnetic wave signal is as follows:

$$t_1 + t_2 = \frac{num + \emptyset/2\pi}{fre} \quad (1)$$

where $fre$ represents a signal frequency; $num$ represents the number of electromagnetic wave cycles corresponding to the frequency; $\emptyset$ represents a phase difference corresponding to the frequency; $t_1$ represents a propagation time of the electromagnetic wave signal underwater; and $t_2$ represents a propagation time of the electromagnetic wave signal in air.

$$l_1 = \frac{c}{\sqrt{\varepsilon_r}} \times t_1 \quad (2)$$

$$l_2 = c \times t_2 \quad (3)$$

$$\frac{h_2}{l_2} = \frac{h_1}{l_1} \quad (4)$$

where $l_1$ and $l_2$ represent lengths of an underwater part and an above-water part of a connection line between the mobile station and the signal receiving device of one of the integrated sensing units Q; $h_1$ and $h_2$ represent lengths of an underwater part and an above-water part of a vertical distance between the mobile station and the signal receiving device of the one of the integrated sensing units Q; $c$ represents a propagation speed of the electromagnetic wave signal in air; and $\varepsilon_r$ represents a relative dielectric constant of the electromagnetic wave signal in water.

By combining formulas (2), (3), and (4), it is obtained that:

$$t_1 = \frac{h_1 \times t_2 \times \sqrt{\varepsilon_r}}{h_2} \quad (5)$$

After $h_1$ and $h_2$ are obtained, a proportional relationship between $t_1$ and $t_2$ is obtained.

When the integrated sensing unit Q undergoes displacement, a propagation time difference of the electromagnetic wave signal is as follows:

$$\Delta t_1 + \Delta t_2 = \frac{\Delta \emptyset / 2\pi}{fre} \quad (6)$$

where $\Delta t_1$ represents a time difference of propagation of the electromagnetic wave signal underwater; $\Delta t_2$ represents a time difference of propagation of the electromagnetic wave signal in air; $\Delta \phi$ represents a phase difference of the electromagnetic wave signal in two measurements before and after the displacement of the integrated sensing unit Q; by substituting formula (5) into formula (6), $\Delta t_1$ and $\Delta t_2$ are calculated.

A movement distance of the integrated sensing unit Q is as follows:

$$\Delta l = \frac{c}{\sqrt{\varepsilon_r}} \times \Delta t_1 + c \times \Delta t_2 \quad (7)$$

With reference to position change data from the three-axis acceleration sensor, a sliding direction of the integrated sensing unit Q is obtained.

In one embodiment, by changing a signal frequency of the electromagnetic wave transmitting device, multiple sets of frequency-related phase parameters are obtained, and the accuracy of the displacement measurement for the integrated sensing unit is improved through calculation based on the multiple sets of frequency-related phase parameters.

In one embodiment, the housing assembly employs a triple waterproof design.

In one embodiment, the water pressure and water temperature sensor is installed on a right side outside the housing assembly, the cable sealing and clamping device is installed in front of the housing assembly, and the signal receiving device is installed on a top outside the housing assembly.

A monitoring method for a reservoir landslide water-level-fluctuation zone is further provided, which is implemented based on the foregoing monitoring system. The method includes the following steps:

S1: determining a spatial distribution range of slopes to be monitored based on preliminary on-site geological investigations, and determining specific monitoring locations of a landslide submerged part;

S2: assigning an address to each of the integrated sensing units for identification, and deploying the integrated sensing units within a water-level-fluctuation zone with several arranged above a highest reservoir water level, several arranged below a lowest reservoir water level, and several arranged in the middle between the lowest reservoir water level and the highest reservoir water level;

S3: connecting the integrated sensing units to the mobile station via cables for power supply and data communication;

S4: obtaining temperature and humidity data within the housing assembly by using the temperature and humidity sensor; if the temperature and humidity data exceeds a threshold, cutting off power of the monitoring system and sending alert information to the mobile station; otherwise, proceeding to the next step.

S5: obtaining position data of the integrated sensing units by using the reference station and the mobile station, obtaining position change data of each of the integrated sensing units by using the three-axis acceleration sensor, and obtaining water depth data, water temperature data, and surge impact data by using the water pressure and water temperature sensor;

S6: transmitting the data obtained in S5 and S4 to the mobile station, and then returning to S4;

S7: transmitting, by the mobile station, all collected monitoring data of the integrated sensing units to the server via a 5G network.

The technical solutions provided by the present disclosure have the following beneficial effects:

The present disclosure provides a monitoring system for a reservoir landslide water-level-fluctuation zone, which includes a reference station, a mobile station, and a plurality of integrated sensing units. The integrated sensing units are configured to detect monitoring data such as water depth, water temperature, water pressure, and surge impact, transmit the data to the mobile station, and receive electromagnetic wave signals and self-measured position change data from the mobile station for location confirmation. In this way, movement data of the integrated sensing units is obtained. The solution of the present disclosure achieves automated monitoring around the clock and throughout the year without the need for human intervention. The monitoring cycle covers the entire deformation and evolution phases of landslides. The present disclosure can be widely applied to deformation monitoring in surface areas, water-level-fluctuation zones, and underwater areas affected by landslides. The use of wireless multi-frequency electromagnetic technology allows for cross-medium displacement measurement from air to water, without being affected by reflection, refraction, or scattering. The multi-frequency measurement approach greatly enhances measurement accuracy. The technology is mature and designed rationally. The use of multiple waterproof and dustproof designs enhances the reliability.

In the figures: onshore reference station 1, onshore mobile station 2, reservoir water level line 7, GNSS 11, solar power supply device 12, solar power supply device 22, electromagnetic wave transmitting device 23, 5G module 14, 5G module 24, monitoring foundation 15, monitoring foundation 25, CAN receiving module 26, sliding mass 3, sliding zone 4, sliding bed 5, integrated sensing unit 6, housing 601, copper column 602, control board 603, circuit board encapsulation box 604, filtering capacitor 605, DCDC module 606, PCB connector 607, encapsulation box baffle 608, transparent acrylic baffle 609, sealing gasket 610, sealing cover 611, sealing ring 612, locking screw 613, temperature and humidity sensor 614, microcontroller unit (MCU) 615, three-axis acceleration sensor 616, adjustable gain unit 617, quadrature demodulation unit 618, RF amplification unit 619, high-pass filter 620, receiving antenna SMA interface 621, signal receiving antenna 622, locking nut 623, sealing ring 624, water pressure and water temperature sensor 625, clamping nut 626, clamping chuck 627, sealing ring 628, threaded adapter 629, sealing gasket 630, sealing ring 631, spring plunger 632, clamping nut 633, clamping plate 634, locking nut 635, cable 636, locking screw 641, sealing gasket 640.

DETAILED DESCRIPTION OF THE EMBODIMENTS

In order to make the objective, technical solution and advantages of the present disclosure clearer, embodiments of the present disclosure will be further described in detail in conjunction with the accompanying drawings.

Figure 1:
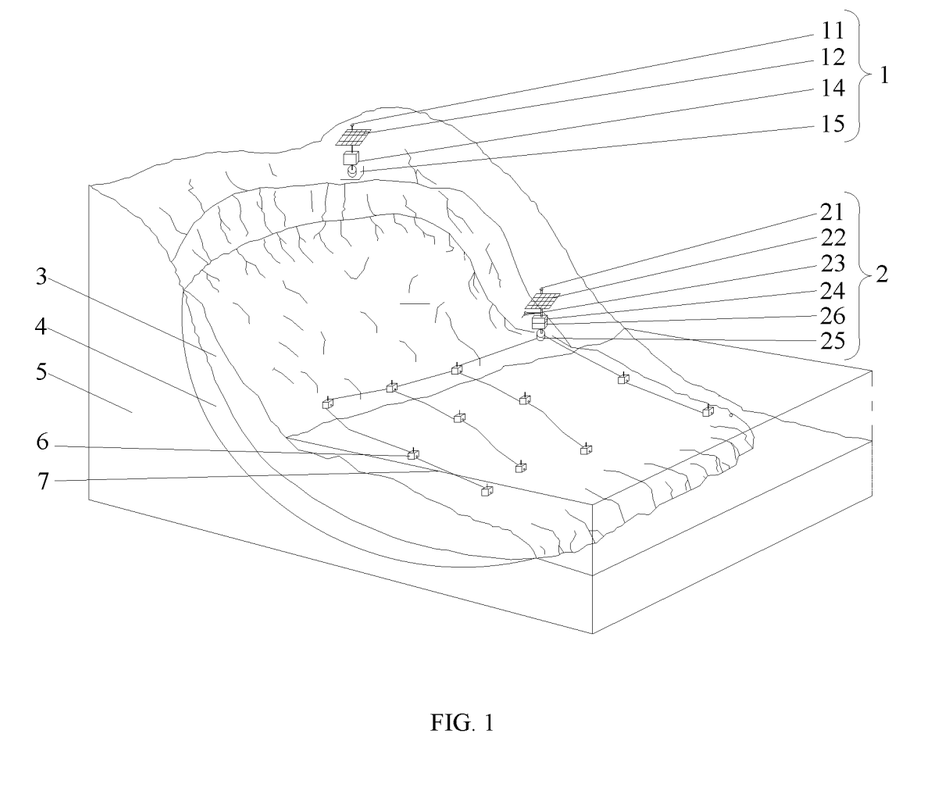
FIG. 1 shows a layout and surrounding environment of a monitoring system for a reservoir landslide water-level-fluctuation zone according to an embodiment of the present disclosure.
Figure 7:
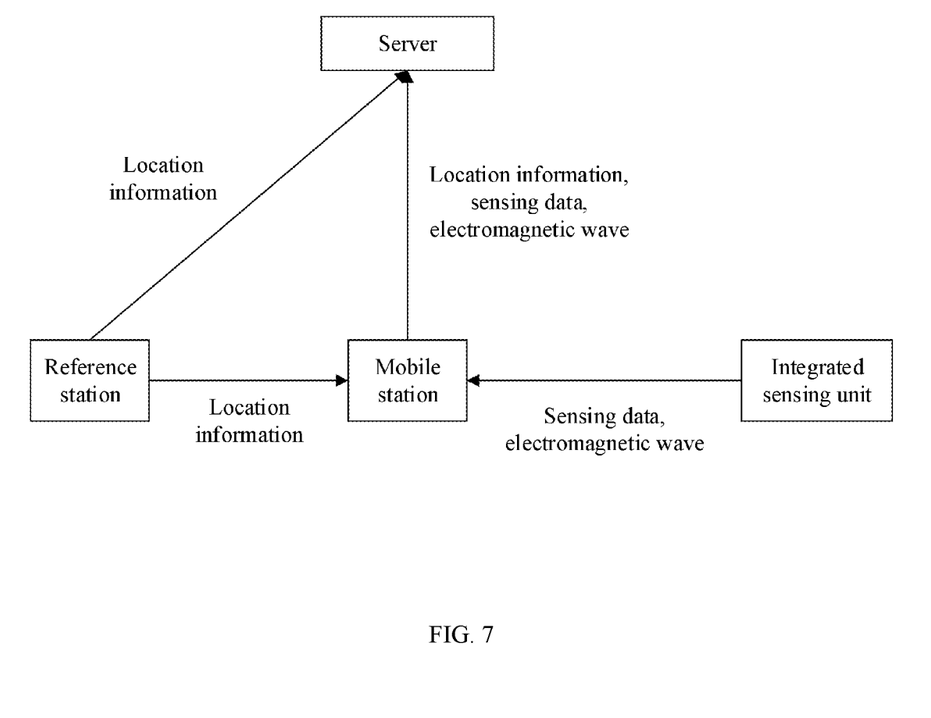
FIG. 7 is a structural schematic diagram showing the monitoring system according to an embodiment of the present disclosure.

As shown in FIG. 1 and FIG. 7, the monitoring system includes two onshore monitoring stations, a plurality of integrated sensing units, and a server.

The integrated sensing unit 6 includes: a housing assembly, a control board 603, a water pressure and water temperature sensor 625, a cable sealing and clamping device, a signal receiving device, a three-axis acceleration sensor 616, a temperature and humidity sensor 614, and a related circuit. The plurality of integrated sensing units 6 are arranged on a surface of the landslide.

The two onshore monitoring stations include a reference station 1 and a mobile station 2.

The signal receiving device includes a signal receiving antenna 622 and a signal processing module. The signal processing module includes: a quadrature demodulation unit 618, an RF amplification unit 619, a high-pass filter 620, and an SMA interface 621.

The reference station is equipped with a GNSS 11, a solar power supply device 12, and a 5G module 14, and is fixed outside a landslide boundary to provide a reference position of the monitoring system for a reservoir landslide water-level-fluctuation zone.

The mobile station is equipped with a GNSS 21, a solar power supply device 22, an electromagnetic wave transmitting device 23, a 5G module 24, and a CAN receiving module 26, and is deployed on a slope surface near the water and above a highest reservoir water level, to obtain position information of the integrated sensing units.

Figure 5:
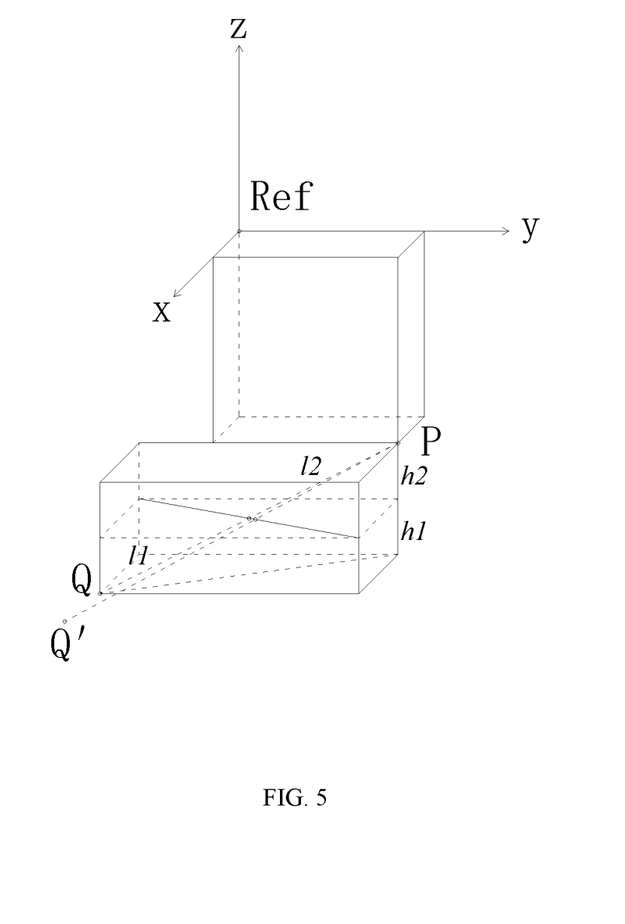
FIG. 5 is a principle diagram for calculation of a movement distance of an integrated sensing unit in a reference coordinate system according to an embodiment of the present disclosure.

The GNSS 11 of the reference station is configured to obtain geographical coordinate information of the reference station as fixed reference coordinates, which is the zero point in the coordinate system shown in FIG. 5, and establish a relative coordinate system.

The GNSS of the mobile station 12 is configured to obtain geographical coordinate information of the mobile station, and establish a relative position within the coordinate system established based on the reference station, which is point P shown in FIG. 5.

The solar power supply device 12 of the reference station is configured to power the reference station and the solar power supply device 22 of the mobile station is configured to power the mobile station and the monitoring system.

The 5G module 14 of the reference station is configured to transmit the position information of the reference station to the server and the mobile station.

The 5G module 24 of the mobile station is configured to transmit all sensor data and position data to the server for processing.

The electromagnetic wave transmitting device 23 includes an RF signal generator, an RF amplification module, and an antenna. The RF signal generator is configured to generate an electromagnetic wave signal with a continuously adjustable frequency. The RF amplification module performs power amplification on the electromagnetic wave signal generated by the RF signal generator and transmits the signal through the antenna.

Figure 2:
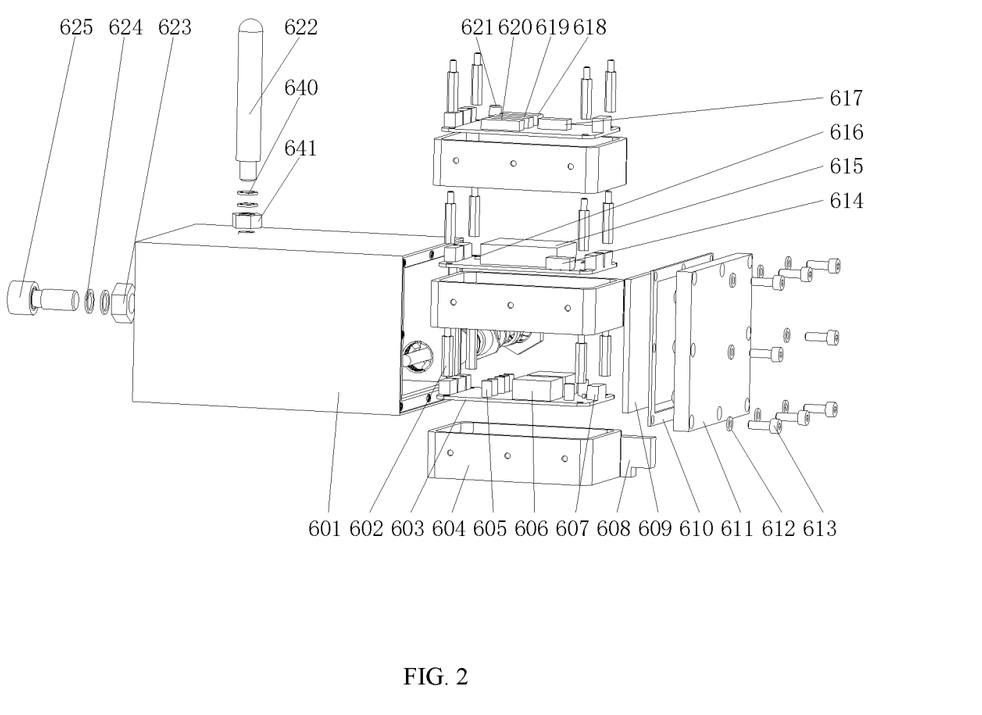
FIG. 2 is an exploded view from the lateral front of an integrated sensing unit according to an embodiment of the present disclosure.

The housing assembly employs a triple waterproof design, as shown in FIG. 2. The housing assembly includes a housing 601, a transparent acrylic baffle 609, a sealing gasket 610, a sealing cover 611, a locking screw 613, and a sealing ring 612. The transparent acrylic baffle 609 is placed in a groove on the left side of the housing assembly, and silicone is injected into the gaps around the transparent acrylic baffle 609 and the groove on the left side of the housing assembly to serve as the first waterproof design. A sealing gasket is installed at the opening on the left side of the housing assembly to serve as the second waterproof design. Then, the sealing cover 611 is placed, and the sealing ring 612 is fitted onto the locking screw 613 to serve as the third waterproof design. Finally, the locking screw 613 is tightened to securely connect the cover of the housing assembly and the lower part of the housing assembly.

Figure 3:
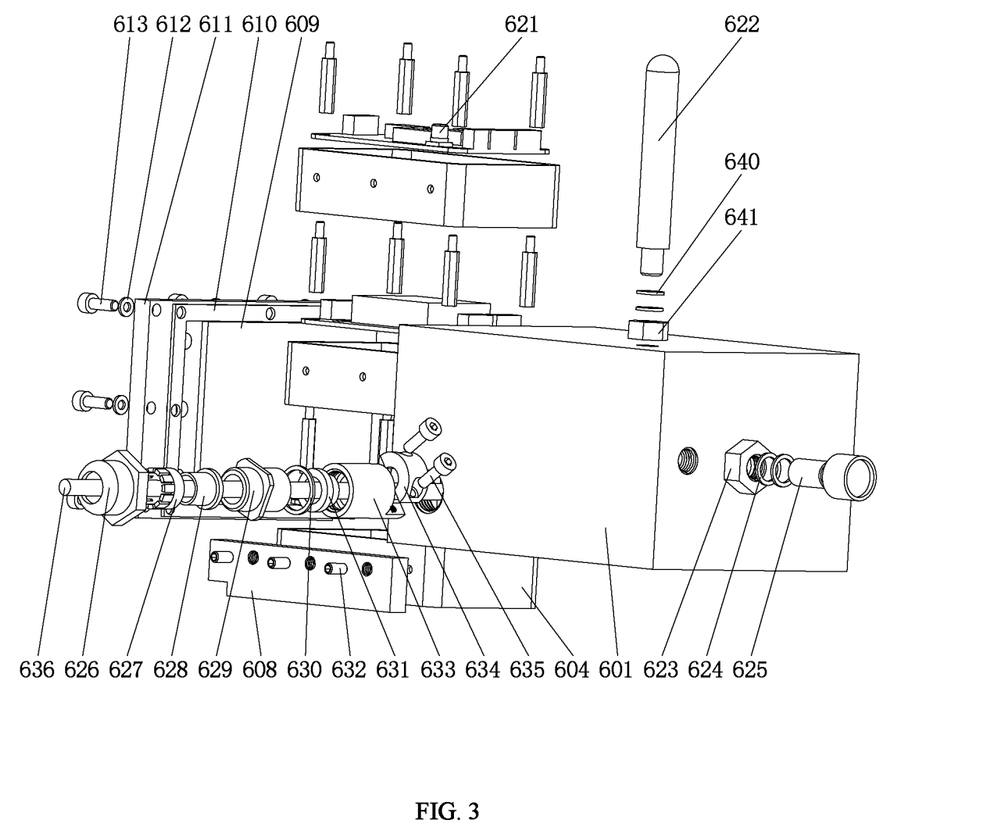
FIG. 3 is an exploded view from the lateral rear of an integrated sensing unit according to an embodiment of the present disclosure.
Figure 4:
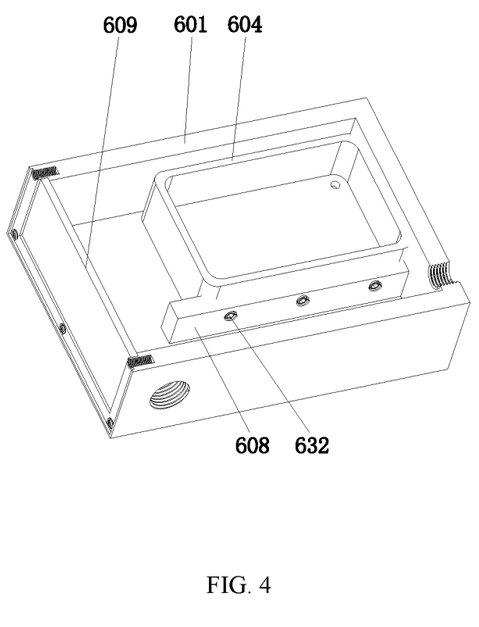
FIG. 4 is a sectional view of a housing assembly according to an embodiment of the present disclosure, including a fixture of a circuit encapsulation box.

A control board is sealed inside the housing assembly, as shown in FIG. 2, FIG. 3, and FIG. 4. The control board includes two parts: a PCB board 603 and an MCU unit 615. The control board is sealed and placed inside the housing assembly. The circuit board encapsulation box 604 has three layers, with the PCB board 603 encapsulated between a bottom layer and a middle layer, and the MCU unit 615 encapsulated between the middle layer and a top layer. Copper columns 602 are used at the four corners to connect the three layers of the circuit board encapsulation box 604. The encapsulation box baffle 608 is located at the bottom layer of the circuit board encapsulation box 604 and is connected to the bottom layer of the circuit board encapsulation box 604 through a spring plunger 632. The temperature and humidity sensor 614 and the three-axis acceleration sensor 616 are located on the same PCB board with the MCU unit 615. The adjustable gain unit 617, quadrature demodulation unit 618, RF amplification unit 619, and high-pass filter 620 of the signal receiving device are fixed above the top layer of the circuit board encapsulation box 604. All of the above components are sealed inside the housing assembly.

A receiving antenna SMA interface 621 and a signal receiving antenna 622 are secured to the top of the housing 601 using a locking screw 641 and a sealing gasket 640. The water pressure and water temperature sensor 625 is secured to the right side of the housing 601 using a locking nut 623 and a sealing ring 624.

The water pressure and water temperature sensor 625, equipped with sealing rings at the inner and outer sides of the threads to prevent soil or water from entering the housing assembly, is configured to measure water depth and water temperature, to provide data for subsequent precise displacement measurements.

The cable sealing and clamping device is arranged in front of the housing 601. The cable sealing and clamping device includes a clamping nut 626, a clamping chuck 627, a sealing ring 628, a threaded adapter 629, a sealing gasket 630, a sealing ring 631, a clamping nut 633, a clamping plate 634, and a locking nut 635. The cable sealing and clamping device is configured to prevent water or soil from entering the housing assembly, and prevent waterproofness of the housing assembly from being destroyed when a cable 636 is dragged.

The signal receiving antenna 622 of the signal receiving device is configured to receive electromagnetic wave signals transmitted by the mobile station 2.

The control board is configured to provide standard power to the sensors and circuits. Input power and output power are isolated from each other to reduce measurement errors caused by power fluctuations. The control board is also configured to process signals detected by the integrated sensing unit 6 and the received electromagnetic wave signals.

The three-axis acceleration sensor 616 is configured to measure position changes of the integrated sensing units.

The temperature and humidity sensor 614 is configured to monitor temperature and humidity changes within the housing assembly to help determine whether water has entered the housing assembly, send alert information when humidity exceeds a certain value, and immediately cut off power within the housing assembly to protect the circuits.

In one embodiment, the integrated sensing unit 6 comprises a standard power to isolate an input power and an output power from each other to reduce measurement errors caused by power fluctuations. The signal receiving device is respectively connected to the three-axis acceleration sensor 616, the temperature and humidity sensor 614, the water pressure and water temperature sensor 625 to obtain monitoring data, and the monitoring date is transmitted to the mobile station 2 via a CAN bus.

The operational principle of the monitoring system is as follows: The reference station 1 receives its own position information provided by the GNSS 11, which serves as the reference coordinates for the entire system. The position information is uploaded to the server via the 5G module 14. The reference station 1 is powered by the solar power supply device 12.

The electromagnetic wave transmitting device 23 of the mobile station 2 emits electromagnetic wave signals. The signal receiving antenna 622 of the signal receiving device in the integrated sensing unit 6 receives the electromagnetic wave signals, and the signals are processed by the adjustable gain unit 617, quadrature demodulation unit 618, RF amplification unit 619, high-pass filter 620, and control board of the signal receiving device. The temperature and humidity sensor 614 is configured to measure the temperature and humidity inside the housing assembly, to detect whether water has entered the housing assembly. The water pressure and water temperature sensor 625 is configured to provide water temperature and water pressure data, which can be used to calculate the depth of water. The three-axis acceleration sensor 616 is configured to provide the position information of the integrated sensing unit 6. The CAN receiving module of the mobile station 2 receives sensor data information and electromagnetic wave signal-related information from the integrated sensing unit 6 through related circuitry between the mobile station and the integrated sensing unit 6. The 5G module 24 of the mobile station 2 uploads the information to the server.

The server processes and monitors the received data.

Below is an example illustrating how the above information is used for calculating the movement distance of the integrated sensing unit. Referring to FIG. 5, FIG. 5 is a principle diagram for calculation of a movement distance of an integrated sensing unit in a reference coordinate system according to an embodiment of the present disclosure; The reference station 1 (Ref) provides the origin position of the coordinate system for the landslide monitoring system, with points P and Q on the reservoir water level line.

A propagation time of the electromagnetic wave signal is as follows:

$$t_1 + t_2 = \frac{num + \emptyset/2\pi}{fre} \quad (1)$$

where fre represents a signal frequency; num represents the number of electromagnetic wave cycles corresponding to the frequency; $\emptyset$ represents a phase difference corresponding to the frequency; $t_1$ represents a propagation time of the electromagnetic wave signal underwater; and $t_2$ represents a propagation time of the electromagnetic wave signal in air.

$$l_1 = \frac{c}{\sqrt{\varepsilon_r}} \times t_1 \quad (2)$$

$$l_2 = c \times t_2 \quad (3)$$

$$\frac{h_2}{l_2} = \frac{h_1}{l_1} \quad (4)$$

where $l_1$ and $l_2$ represent lengths of an underwater part and an above-water part of a straight-line distance between the mobile station 2 (P) and the integrated sensing unit 6 (Q); $h_1$ and $h_2$ represent lengths of an underwater part and an above-water part of a vertical distance between the mobile station 2 (P) and the signal receiving device of the integrated sensing unit 6 (Q); c represents a propagation speed of the electromagnetic wave signal in air; and $\varepsilon_r$ represents a relative dielectric constant of the electromagnetic wave signal in water.

By combining formulas (2), (3), and (4), it is obtained that:

$$t_1 = \frac{h_1 \times t_2 \times \sqrt{\varepsilon_r}}{h_2} \quad (5)$$

After $h_1$ and $h_2$ are obtained, a proportional relationship between $t_1$ and $t_2$ is obtained.

When the integrated sensing unit Q moves to Q', a propagation time difference of the electromagnetic wave signal is as follows:

$$\Delta t_1 + \Delta t_2 = \frac{\Delta\emptyset/2\pi}{fre} \quad (6)$$

where $\Delta t_1$ represents a time difference of propagation of the electromagnetic wave signal underwater; $\Delta t_2$ represents a time difference of propagation of the electromagnetic wave signal in air; $\Delta\emptyset$ represents a phase difference of the electromagnetic wave signal in two measurements before and after the displacement of the integrated sensing unit Q; by substituting formula (5) into formula (6), $\Delta t_1$ and $\Delta t_2$ are calculated.

A movement distance of the integrated sensing unit Q is as follows:

$$\Delta l = \frac{c}{\sqrt{\varepsilon_r}} \times \Delta t_1 + c \times \Delta t_2 \quad (7)$$

With reference to position change data from the three-axis acceleration sensor, a sliding distance and direction of the integrated sensing unit Q are obtained.

Further, by changing a signal frequency fre of the electromagnetic wave transmitting device 13, multiple sets of frequency-related phase parameters are obtained, and the accuracy of the displacement measurement for the integrated sensing unit is improved through calculation based on the multiple sets of frequency-related phase parameters.

Figure 6:
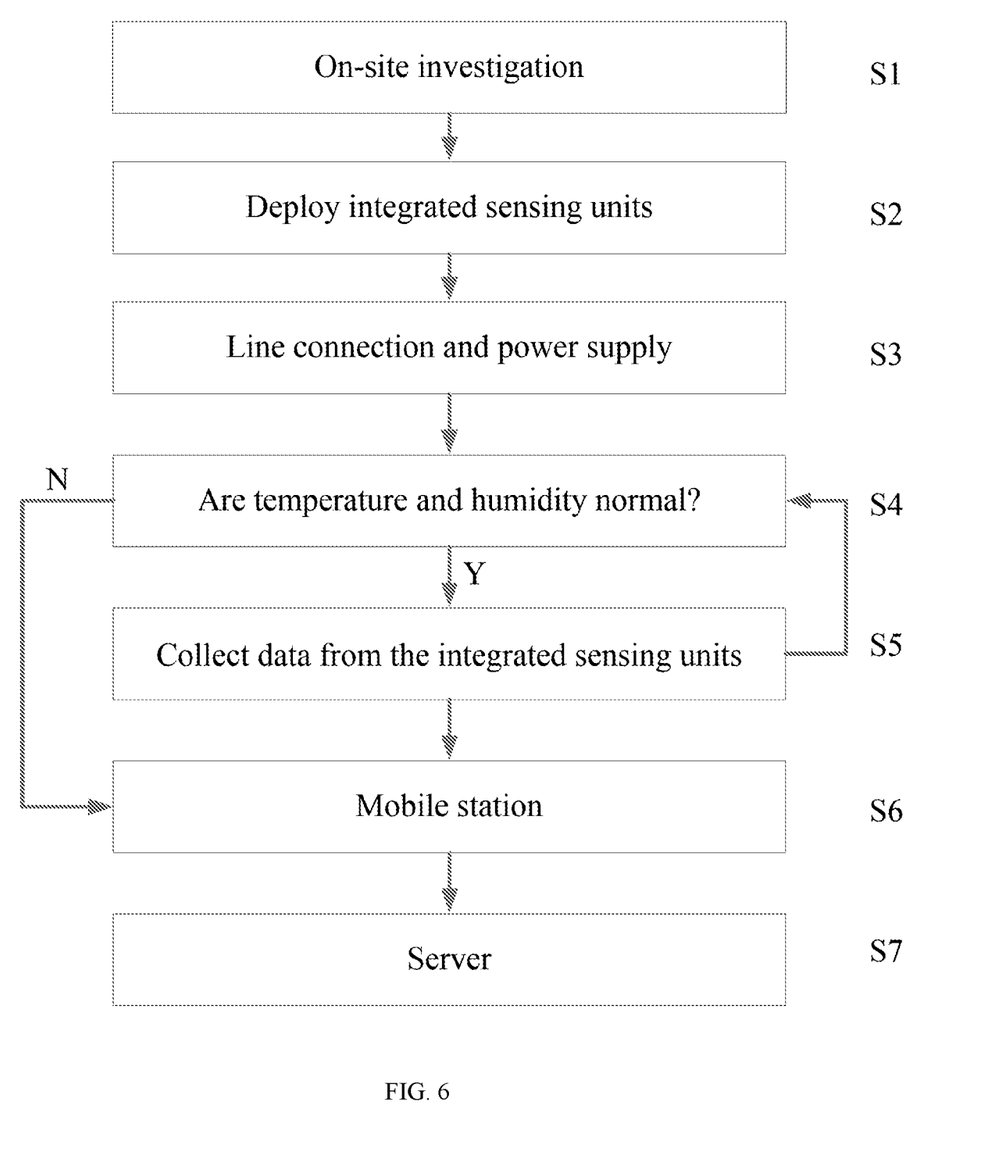
FIG. 6 is a flowchart showing a monitoring method according to an embodiment of the present disclosure.

An embodiment of the present disclosure further provides a monitoring method for a reservoir landslide water-level-fluctuation zone, which is implemented based on the foregoing monitoring system for a reservoir landslide water-level-fluctuation zone. Referring to FIG. 6, the method includes the following steps:

S1: Determine a spatial distribution range of slopes to be monitored based on preliminary on-site geological investigations, and determine specific monitoring locations of a landslide submerged part.

In FIG. 1, the reference station 1 is fixed outside the boundary of the landslide. The monitoring foundation 15 is used to install the onshore reference station 1 for monitoring. The mobile station 2 is deployed on a slope surface near the water and above a highest reservoir water level. The monitoring foundation 25 is used to install the onshore mobile station 2 for monitoring. Once the positions and distribution of the sliding mass 3, sliding zone 4, sliding bed 5, and reservoir water level line 7 are confirmed, the integrated sensing units 6 are arranged. The integrated sensing units 6 on multiple slope surfaces are distributed in a grid pattern on the reservoir bank, and are individually secured to the sliding mass 3 through brackets or other auxiliary devices. Upper surfaces of the integrated sensing units 6 are close to or in contact with the slope.

S2: Assign an address to each integrated sensing unit for identification, and deploy the integrated sensing units within a water-level-fluctuation zone. Some units are arranged above the highest reservoir water level, some units are arranged below a lowest reservoir water level, and some units are arranged in the middle between the lowest reservoir water level and the highest reservoir water level.

S3: Connect the integrated sensing units to the mobile station via cables for power supply and data communication.

S4: Obtain temperature and humidity data within the housing assembly by using the temperature and humidity sensor; if the temperature and humidity data exceeds a threshold, cut off power of the monitoring system and send alert information to the mobile station; otherwise, proceed to the next step.

S5: Obtain position data of the integrated sensing units by using the reference station and the mobile station, obtain position change data of each integrated sensing unit by using the three-axis acceleration sensor, and obtain water depth data, water temperature data, and surge impact data by using the water pressure and water temperature sensor.

S6: Transmit the data obtained in S5 and S4 to the mobile station, and then return to S4.

S7: The mobile station transmits all collected monitoring data of the integrated sensing units to the server via a 5G network.

The above description of the disclosed embodiments enables those skilled in the art to achieve or use the present disclosure. Various modifications to these embodiments are readily apparent to those skilled in the art, and the generic principles defined herein may be practiced in other embodiments without departing from the spirit or scope of the present disclosure. Accordingly, the present disclosure will not be limited to these examples shown herein, but is to fall within the widest scope consistent with the principles and novel features disclosed herein.

What is claimed is:

1. A monitoring system for a reservoir landslide water-level-fluctuation zone, comprising two onshore monitoring stations, a plurality of integrated sensing units, and a server; wherein the integrated sensing unit comprises: a housing assembly, a control board, a water pressure and water temperature sensor, a cable sealing and clamping device, a signal receiving device, a three-axis acceleration sensor, and a temperature and humidity sensor;
the signal receiving device comprises a signal receiving antenna and a signal processing module;
the two onshore monitoring stations comprise a reference station and a mobile station;
the reference station is equipped with a Global Navigation Satellite System (GNSS), a solar power supply device, and a 5G module, and is fixed outside a landslide boundary to obtain a reference position for landslide deformation monitoring data;
the mobile station is equipped with the GNSS, an electromagnetic wave transmitting device, the solar power supply device, the 5G module, and a Controller Area Network (CAN) receiving module, and is arranged on a slope surface near the water and above a highest reservoir water level, to obtain position information of the integrated sensing units;
the GNSS of the reference station is configured to obtain geographical coordinate information of the reference station as fixed reference coordinates and establish a relative coordinate system;
the GNSS of the mobile station is configured to obtain geographical coordinate information of the mobile station, and establish a relative position within a coordinate system established based on the reference station;
the solar power supply device of the reference station is configured to power the reference station and the solar power supply device of the mobile station is configured to power the mobile station and the monitoring system;
the 5G module of the reference station is configured to transmit the position information of the reference station to the server and the mobile station;
the 5G module of the mobile station is configured to receive the position information of the reference station, and transmit all sensor data and position data to the server for processing;
the control board, the temperature and humidity sensor, the three-axis acceleration sensor, and the signal processing module of the signal receiving device are sealed inside the housing assembly; the water pressure and water temperature sensor is configured to measure a water depth, a water temperature, and a surge impact pressure;
the cable sealing and clamping device is configured to prevent water or soil from entering the housing assembly, and prevent waterproofness of the housing assembly from being destroyed when a cable is dragged;
the signal receiving antenna is arranged in the signal receiving device to receive electromagnetic wave signals transmitted by the mobile station;
the control board is configured to process signals detected by the integrated sensing units and the received electromagnetic wave signals;
the three-axis acceleration sensor is configured to measure position changes of the sensing units; and
the temperature and humidity sensor is configured to monitor temperature and humidity changes within the housing assembly to help determine whether water has entered the housing assembly, and send alert information and immediately cut off power within the housing assembly to protect circuits when humidity exceeds a certain value.

2. The monitoring system according to claim 1, wherein the electromagnetic wave transmitting device comprises a radio frequency (RF) signal generator, an RF amplification module, and an antenna; the RF signal generator is configured to generate an electromagnetic wave signal with a continuously adjustable frequency; and the RF amplification module performs power amplification on the electromagnetic wave signal generated by the RF signal generator, and the amplified electromagnetic wave signal is transmitted through the antenna.

3. The monitoring system according to claim 1, wherein the signal processing module comprises: a quadrature demodulation unit, a radio frequency (RF) amplification unit, a high-pass filter, and a receiving antenna SubMiniature version A (SMA) interface.

4. The monitoring system according to claim 1, wherein a propagation time of the electromagnetic wave signal is as follows:

$$t_1 + t_2 = \frac{num + \emptyset/2\pi}{fre} \quad (1)$$

wherein $fre$ represents a signal frequency; $num$ represents the number of electromagnetic wave cycles corresponding to the frequency; $\emptyset$ represents a phase difference corresponding to the frequency; $t_1$ represents a propagation time of the electromagnetic wave signal underwater; and $t_2$ represents a propagation time of the electromagnetic wave signal in air;

$$l_1 = \frac{c}{\sqrt{\varepsilon_r}} \times t_1 \quad (2)$$

$$l_2 = c \times t_2 \quad (3)$$

$$\frac{h_2}{l_2} = \frac{h_1}{l_1} \quad (4)$$

wherein $l_1$ and $l_2$ represent lengths of an underwater part and an above-water part of a connection line between the mobile station and the signal receiving device of one of the sensing units Q; $h_1$ and $h_2$ represent lengths of an underwater part and an above-water part of a vertical distance between the mobile station and the signal receiving device of the one of the sensing units Q; c represents a propagation speed of the electromagnetic wave signal in air; and $\varepsilon_r$ represents a relative dielectric constant of the electromagnetic wave signal in water;

by combining formulas (2), (3), and (4), it is obtained that:

$$t_1 = \frac{h_1 \times t_2 \times \sqrt{\varepsilon_r}}{h_2} \quad (5)$$

after $h_1$ and $h_2$ are obtained, a proportional relationship between $t_1$ and $t_2$ is obtained;

when the integrated sensing unit Q undergoes displacement, a propagation time difference of the electromagnetic wave signal is as follows:

$$\Delta t_1 + \Delta t_2 = \frac{\Delta \phi / 2\pi}{fre} \quad (6)$$

wherein $\Delta t_1$ represents a time difference of propagation of the electromagnetic wave signal underwater; $\Delta t_2$ represents a time difference of propagation of the electromagnetic wave signal in air; $\Delta \phi$ represents a phase difference of the electromagnetic wave signal in two measurements before and after the displacement of the integrated sensing unit Q; and by substituting formula (5) into formula (6), $\Delta t_1$ and $\Delta t_2$ are calculated;

a movement distance of the integrated sensing unit Q is as follows:

$$\Delta l = \frac{c}{\sqrt{\varepsilon_r}} \times \Delta t_1 + c \times \Delta t_2 \quad (7)$$

with reference to position change data from the three-axis acceleration sensor, a sliding direction of the integrated sensing unit Q is obtained.

5. The monitoring system according to claim 4, wherein by changing a signal frequency of the electromagnetic wave transmitting device, multiple sets of frequency-related phase parameters are obtained, and an accuracy of the displacement measurement for the integrated sensing units is improved through calculation based on the multiple sets of frequency-related phase parameters.

6. The monitoring system according to claim 1, wherein the housing assembly is designed to be waterproof.

7. The monitoring system according to claim 1, wherein the water pressure and water temperature sensor is installed on a right side outside the housing assembly, the cable sealing and clamping device is installed in front of the housing assembly, and the signal receiving device is installed on a top outside the housing assembly.

8. A monitoring method for a reservoir landslide water-level-fluctuation zone, implemented based on the monitoring system according to claim 1, comprising the following steps:

S1: determining a spatial distribution range of slopes to be monitored based on preliminary on-site geological investigations, and determining specific monitoring locations of a landslide submerged part;

S2: assigning an address to each of the integrated sensing units for identification, and deploying the integrated sensing units within a water-level-fluctuation zone with several arranged above the highest reservoir water level, several arranged below a lowest reservoir water level, and several arranged in a middle between the lowest reservoir water level and the highest reservoir water level;

S3: connecting the integrated sensing units to the mobile station via cables for power supply and data communication;

S4: obtaining temperature and humidity data within the housing assembly by using the temperature and humidity sensor; when the temperature and humidity data exceeds a threshold, cutting off power of the monitoring system and sending alert information to the mobile station; otherwise, proceeding to the next step;

S5: obtaining position data of the integrated sensing units by using the reference station and the mobile station, obtaining position change data of each of the integrated sensing units by using the three-axis acceleration sensor, and obtaining water depth data, water temperature data, and surge impact data by using the water pressure and water temperature sensor;

S6: transmitting the data obtained in S5 and S4 to the mobile station, and then returning to S4;

S7: transmitting, by the mobile station, all collected monitoring data of the integrated sensing units to the server via a 5G network.

* * * * *